Figure 1:
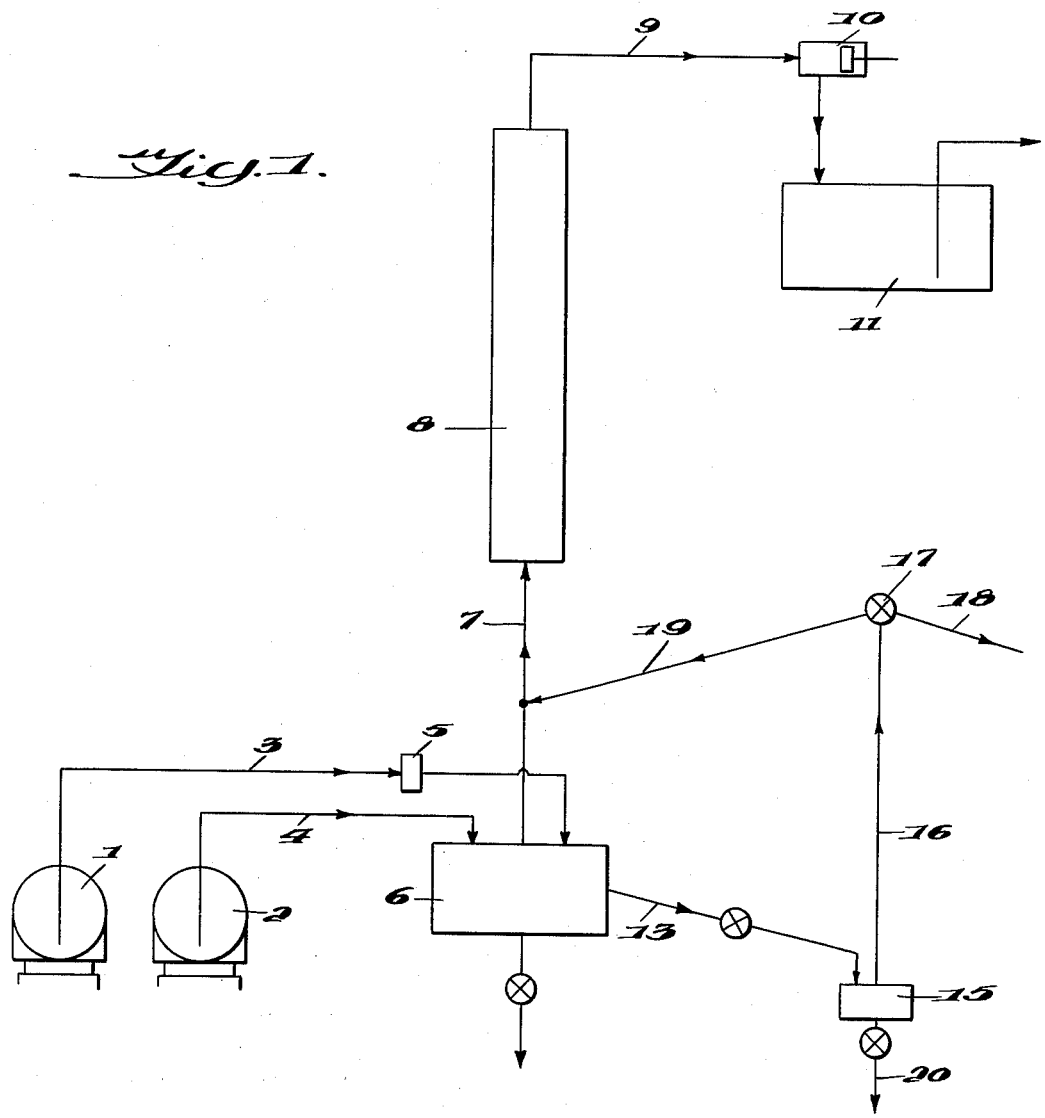

Sept. 13, 1955

L. HÜTER ET AL 2,717,911

PROCESS FOR THE PRODUCTION OF ALKYL
BROMIDES, ESPECIALLY
METHYL BROMIDE

Filed Feb. 13, 1953

2 Sheets-Sheet 2

INVENTORS
LUDWIG HÜTER,
HERMANN VEITH,

BY Bailey, Stephens & Huettig

ATTORNEYS

2,717,911

PROCESS FOR THE PRODUCTION OF ALKYL BROMIDES, ESPECIALLY METHYL BROMIDE

Ludwig Hüter and Hermann Veith, Frankfurt am Main, Germany, assignors to Deutsche Gold- und Silber-Scheideanstalt vormals Roessler, Frankfurt am Main, Germany Application February 13, 1953, Serial No. 336,856

Claims priority, application Germany February 19, 1952

11 Claims. (Cl. 260—652)

The present invention relates to a novel process for the production of alkyl bromides and especially methyl bromide from bromine and the corresponding aliphatic alcohols.

As is known, alkyl bromides are customarily prepared by treating the corresponding alcohols with gaseous or liquid hydrogen bromide, the hydrogen bromide normally being prepared by the reduction of bromine mainly with red phosphorus or sulfurous acid.

Methyl bromide has recently become an important compound for methylation purposes in organic chemistry, as a fire extinguisher and particularly in pest control. The technical processes for the production of methyl bromide primarily employ methane and bromine or methanol, sulfur dioxide and bromine as starting materials. The first reaction mentioned produces a quantity of hydrogen bromide equivalent to that of the methyl bromide produced so that at best only 50% yields can be obtained based upon the quantity of bromine used.

In the production of methyl bromide from bromine, sulfur dioxide and methanol, a gas phase reaction usually in the presence of water is normally employed. While such process is highly developed technically, it still only produces two molecules of methyl bromide per sulfur atom employed.

In accordance with the invention, it has been found that alkyl bromides and especially methyl bromide can be produced in a simple manner from the corresponding alcohol, bromine and a sulfurous compound in which the sulfur has less positive change than in sulfur dioxide, in which it has a positive valence of four. Thus, in accordance with the invention, sulfurous material, namely, sulfur or sulfur compounds, are employed in which the sulfur has a valence which is less positive than a positive valence of four. For example, hydrogen sulfide compounds as well as elemental sulfur in colloidal form or in solution in an inert solvent are suited for the process according to the invention. When employing hydrogen sulfide, the formation of methyl bromide proceeds according to the following equation:

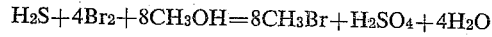

$$H_2S + 4Br_2 + 8CH_3OH = 8CH_3Br + H_2SO_4 + 4H_2O$$

In employing hydrogen sulfide, 8 molecules of methyl bromide are produced per sulfur atom and in employing elemental sulfur, 6 molecules of methyl bromide per sulfur atom are obtained, whereas only 2 molecules per sulfur atom are obtained when employing the sulfur dioxide employed by the prior art.

The alkyl bromide production according to the invention, depending upon the sulfurous material employed, can take place in the vapor, vapor-liquid or homogeneous liquid phase. When the vaporizable hydrogen sulfide compounds are employed as the sulfurous material, the reaction can be carried out under all of these conditions, but preferably in the vapor phase or in the liquid phase. When sulfur is employed as the sulfurous material, it is preferable to carry out the reaction in the liquid phase. Carrying out the reaction in the liquid phase provides the advantage that the apparatus can be smaller and furthermore, that the hydrogen bromide which is formed as an intermediate in the reaction is not set free from the liquid reaction mixture during the reaction.

The reaction according to the invention proceeds very rapidly and produces substantially quantitative yields of the alkyl bromide desired.

Hydrogen sulfide and other hydrogen and sulfur compounds such as the so-called hydrogen polysulfides have been found particularly suitable as the sulfurous material employed according to the invention. The so-called sulfur raw oil (German Schwefelrohöl), primarily $H_2S_2$, has been found particularly suitable when carrying out the process according to the invention in the liquid phase in view of the ease of handling such material and the ease of its introduction into a homogeneous reaction system.

It is unimportant in the process of the invention whether the hydrogen sulfide compound is supplied as such to the reaction system or is formed therein. As in every instance one of the reaction products is sulfuric acid, all sulfides which are decomposable with acids can be employed as the source of the sulfurous material especially those of the alkali metals, alkaline earth metals and the earth metals such as aluminum. When polysulfides including hydrogen polysulfides are employed, colloidal sulfur is formed in the reaction system in addition to hydrogen sulfide. Such colloidal sulfur, as indicated above, is also reactive for the formation of alkyl bromides according to the process of the invention. It is, therefore, also possible to employ other materials which set free sulfur under the conditions of the reaction, for example, thiosulfates, dithionates or polythionates. Consequently, the above-mentioned compounds which set free hydrogen sulfide and/or elemental sulfur under acid conditions can be employed for the production of alkyl bromides in combination with an acid, bromine and the corresponding alcohol.

It has been found advantageous, when elemental sulfur is employed according to the invention, to carry out the process in the presence of small quantities of materials which dissolve sulfur without chemical alteration such as carbon disulfide, chloroform and carbon tetrachloride. The addition of such solvents expedites the initiation and progress of the reaction. Preferably the quantity of such solvent employed is insufficient to dissolve all of the sulfur added, as it was found that the use of relatively large quantities of solvent tends to retain larger quantities of the alkyl bromide formed in the reaction solution and thereby shift the equilibrium of the reaction unfavorably. The reason for this is that such solvents have a tendency to dissolve the alkyl bromide distilling off and to return it to the reaction solution.

As the reaction forming the basis for the process according to the invention is exothermic the heat of reaction in many instances is sufficient to heat the reaction mixtures to near the boiling point of the alcohol employed which is particularly expedient when the reaction is carried out in a liquid form reaction medium. For example, in the production of methyl bromide it has been found preferable when employing a liquid phase reaction to employ a temperature around 65° C.

Or if according to another preferred modification, the reaction is carried out in the vapor phase using, for example, $H_2S$ as the sulfurous material, it was found that the heat of reaction substantially sufficed to maintain the alcohol and bromide in the vapor phase. When carrying out the reaction in the vapor phase it was found preferable not to employ a temperature too far in excess of the boiling point of the aliphatic alcohol reaction. For example, it was found advantageous to carry out the reaction at a temperature 10° to 35° C. and preferably 20–30° C. above the boiling point of the alcohol employed. Preferably the gas phase reaction is carried out in a reaction column containing filling material and glass wool has been found especially adapted as such filling material.

The process according to the invention has the advantage over the previous processes which employed $SO_2$ that it is not necessary to introduce substantial quantities of water or steam with the reaction system to initiate the reaction. The sulfuric acid formed during the reaction is also not as dilute as when $SO_2$ was employed as it is not necessary to add water to the reaction system continuously as was the case in the previously known processes employing $SO_2$. On the other hand the concentration of the sulfuric acid is not so high as to give rise to the danger of forming undesired esters or ethers with the alcohol employed.

The rapidity and completeness of the reaction according to the invention render it especially useful for the continuous production of alkyl bromides whether the reaction is carried out in the liquid phase with, for example, liquid bromine and liquid methanol with colloidal sulfur dispersed therein or in the gaseous phase wherein the bromine, the alcohol and the sulfurous compound such as $H_2S$ are in the gaseous phase.

It has been found advantageous to employ a two stage process for the continuous production of alkyl bromides in the liquid phase, each stage being carried out in a separate reaction vessel. In the first stage only a partial conversion, preferably about 70%, is effected at a temperature near the boiling point of the alcoholic reaction component employing only the heat of the reaction to maintain the desired temperature. The gaseous reaction products formed in the first stage are continuously distilled off whereas the liquid remaining is drawn off into the reaction vessel for the second stage in which the reaction is completed while heating such reaction vessel to a temperature above the boiling point of the alcohol employed. The distillate which results in the second stage, if desired after removal of the water, is recycled to the first stage.

The accompanying drawings show by way of example several modifications of apparatus suitable for carrying out the process according to the invention.

Figure 2:
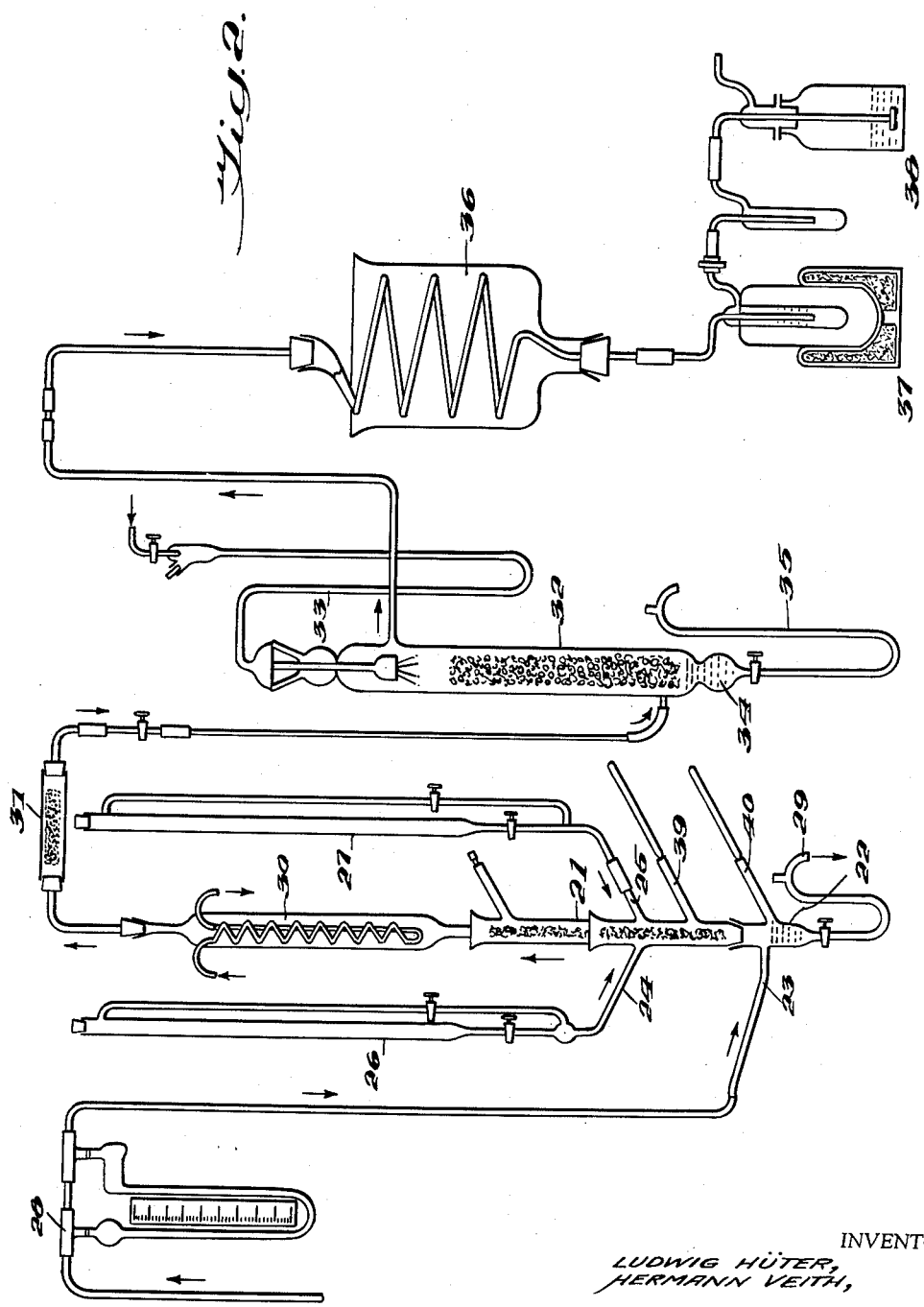

In the drawings:

Fig. 1 diagrammatically shows an apparatus for carrying out the process according to the invention in the liquid phase, and, Fig. 2 diagrammatically shows an apparatus for carrying out the process according to the invention in the vapor phase.

Referring to Fig. 1, the liquid alcohol such as methanol and liquid bromine are supplied respectively from tank cars 1 and 2 through lines 3 and 4 into reaction chamber 6. A dispersion of colloidal sulfur is supplied to the methanol at 5. As soon as the reaction in the reaction chamber 6 has initiated the heat of reaction evolved is sufficient to maintain the desired reaction temperature of, for example, about 65° C. The strong stream of methyl bromide which is evolved is introduced into dephlegmator 8 through line 7 where it is freed from the methanol which it carries along. The methyl bromide leaving the dephlegmator through line 9 is liquified in a compressor 10 and stored in vessel 11. The partly reacted reaction liquid continually flows out of reaction chamber 6 through line 13 and is supplied to the second reaction chamber 15 for the second stage of the reaction. Reaction chamber 15 is maintained at a temperature between 70 and 130° C. by additional heating and the reaction is substantially completed therein. The methyl bromide formed and the distilling methanol are returned to line 7 over lines 16 and 19 and are also separated in dephlegmator 8. The methanol which is separated in the dephlegmator flows back into reaction chamber 6.

The concentrated sulfuric acid resulting from the reaction is withdrawn from vessel 15 through line 20. A three way cock 17 is provided between lines 16 and 19 and connected to drain 18 for withdrawal of any water carried along by the gases.

Any small quantities of dimethyl ether which may be formed in the last stages of the reaction in reaction chamber 15 will be recycled back to reaction chamber 6 together with the methanol leaving reaction chamber 15. As a constant excess of bromine is present in reaction chamber 1 such dimethyl ether will also be converted to methyl bromide. Consequently, it is possible to produce very pure methyl bromide with a maximum yield.

Referring to Fig. 2, reaction column 21 which is filled with glass wool is provided below the reaction space with three supply lines 23, 24 and 25. Lines 24 and 25 serve for the regulated introduction of liquid methanol and liquid bromine from storage vessels 26 and 27. Supply line 23 which is located below supply lines 24 and 25 serve for the introduction of $H_2S$ into column 21. A flow meter 28 is provided in supply lines 23 to regulate the quantity of $H_2S$ supplied. Collecting vessel 22 located at the bottom of column 21 is provided with a siphon like overflow through which the sulfuric acid formed is continuously withdrawn. A refluxing column 30 is provided at the head of column 21, from which the gaseous reaction products are supplied through filter 31 into a wash column 32 which is filled with loosely packed Raschig rings. The water serving as a washing liquid is supplied to wash column 32 through line 33 and is continuously withdrawn from collecting vessel 34 through line 35. The washed methyl bromide is condensed in cooler 36 and collected in cooled collectors 37 and 38.

To initiate the reaction column 21 is heated externally to the reaction temperature of, for example, about 85° C. After the reaction has initiated the heat of reaction evolved is so strong that further external heating can in many instances be omitted. The temperatures occurring in the reaction column can be observed at thermometers 39 and 40 and can easily be controlled by regulating the quantity of the reactants supplied to the reaction column. Additional heating can also be provided for collecting vessel 22 so that any methanol and any HBr carried along by the condensed sulfuric acid are vaporized and returned to the reaction column.

The following examples illustrate several modifications of the process according to the invention.

*Example 1*

20 grams of liquid sulfur raw oil (primarily $H_2S_2$) were mixed with 160 grams of cold water free methanol and then 200 grams of bromine were added dropwise and the reaction initiated. After 5 minutes the solution began to boil and a rapidly increasing stream of methyl bromide was evolved. The methanol carried along by the methyl bromide was separated in a dephlegmator and the methyl bromide condensed in a cooler. The reaction was complete after two hours which was indicated by a complete lightening of the methanol-bromine solution. The yield of methyl bromide of 98.6% purity (water and HBr free) was 237 grams.

*Example 2*

300 grams of colloidal sulfur, 10 grams of carbon disulfide were mixed with 3.5 kilograms of practically water free methanol. 4.33 kilograms of liquid bromine were added to this mixture from a dropping funnel over a period of two hours. After one further hour the reaction was complete as indicated by complete lightening of the reaction solution. The methyl bromide which was collected in the same manner as in Example 1 was of the same purity as that of Example 1. The yield was 5.19 kilograms or practically 100%.

*Example 3*

15 grams of colloidal sulfur and 0.3 gram of carbon disulfide were mixed with 230 grams of ethanol and 200 grams of bromine were added to the mixtures over a period of 30 minutes. Thereafter the reaction solution was maintained boiling for another hour and then fractionated. The yield was 268 grams of ethyl bromide B. P. 38–41° C., 98% pure. The yield on bromine therefore was also practically quantitative.

*Example 4*

120 grams per hour of bromine and a slight excess over the equivalent quantities of methanol and $H_2S$ were supplied to the apparatus shown in Fig. 2 while maintaining a temperature of 85° C. in the reaction column. The yield of methyl bromide was 99 to 100% based upon the bromine introduced. A comparative test employing the same apparatus but employing $SO_2$ instead of $H_2S$ as in the prior art processes showed that the velocity of conversion was about 75% less.

We claim:

1. A process for the production of an alkyl bromide which comprises reacting the corresponding alcohol, bromine and a compound of hydrogen and sulfur.
2. A process according to claim 1 in which said reaction is carried out in the liquid phase.
3. A process according to claim 1 in which said reaction is carried out in the liquid phase at an elevated temperature near the boiling point of such alcohol and substantially the heat of reaction is employed to maintain such elevated temperature.
4. A process according to claim 1 in which said sulfurous material is a hydrogen polysulfide.
5. A process according to claim 1 in which said sulfurous material is a hydrogen sulfide.
6. A process for the production of an alkyl bromide which comprises reacting the corresponding alcohol, bromine and a compound of sulfur and hydrogen in the vapor phase.
7. A process for the production of methyl bromide which comprises reacting methanol, bromine and hydrogen sulfide in the vapor phase.
8. A process according to claim 7 in which said reaction is carried out at a temperature 10° to 35° C. over the boiling point of methanol.
9. A process according to claim 7 in which said reaction is carried out at a temperature 20° to 30° C. over the boiling point of methanol.
10. A process according to claim 1 in which the alkyl bromide is methyl bromide and the alcohol is methanol.
11. A process for the continuous production of an alkyl bromide which comprises continuously supplying the corresponding alcohol, bromine and a compound of hydrogen and sulfur to a reaction zone, reacting such mixture in said reaction zone at a temperature below the boiling point of the alcohol in the liquid phase, continuously withdrawing a portion of the liquid reaction mixture from said reaction zone before the reaction has completed and introducing such reaction mixtures into a second reaction zone heated to a temperature above the boiling point of the alcohol, whereby a distillate containing the alcohol and the alkyl bromide is produced, separating the alcohol from said distillate and returning it to the first mentioned reaction zone, and collecting the alkyl bromide formed.

References Cited in the file of this patent

UNITED STATES PATENTS 2,359,828     Davies _____ Oct. 10, 1944

FOREIGN PATENTS 554,956     Great Britain _____ May 5, 1942